April 15, 1930.  E. ERICSSON  1,754,989

PNEUMATIC SPRING

Filed March 20, 1924

Inventor

Elov Ericsson

By John E. Stryker his Attorney

Patented Apr. 15, 1930

1,754,989

UNITED STATES PATENT OFFICE

ELOV ERICSSON, OF ST. PAUL, MINNESOTA

PNEUMATIC SPRING

Application filed March 20, 1924. Serial No. 700,562.

It is my object to minimize damage to vehicles and discomfort to occupants thereof caused by travel over rough roads by providing a novel and highly efficient pneumatic spring adapted to replace leaf springs and auxiliary shock absorbers.

A further object is to reduce the amplitude of the vibrations produced in a spring of this kind and at the same time to provide a cylinder of unusually compact construction.

Another object is to provide simple and efficient means for connecting the piston of a pneumatic cylinder with the axle of a vehicle.

My invention also includes certain other features of construction which will be more fully pointed out in the following specification and claims.

Figure 1:
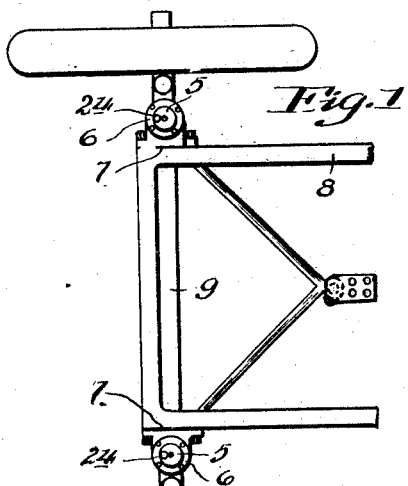
Figure 2:
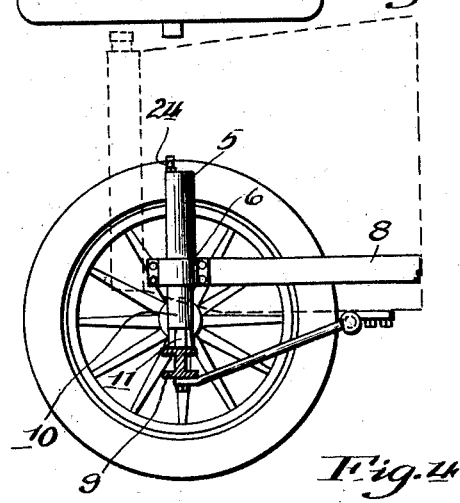
Figure 4:
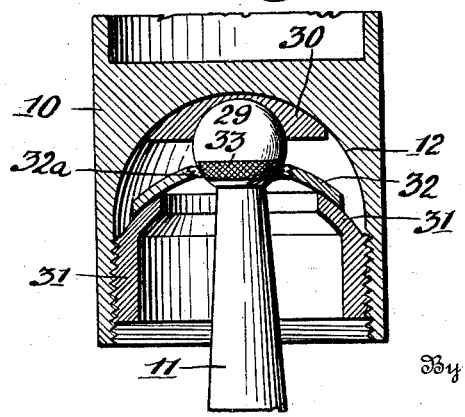
Figure 3:
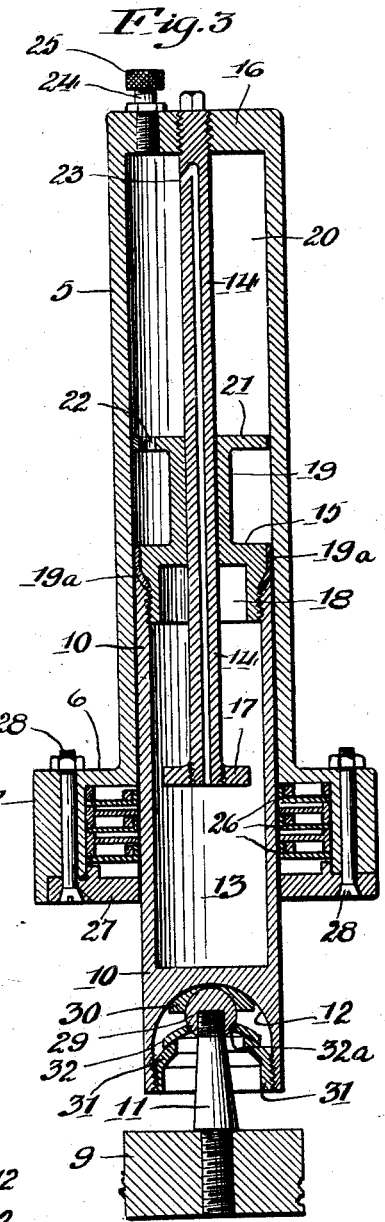

The accompanying drawings illustrate the best form of my device at present known to me. Referring to the drawings, Figure 1 is a plan view of my invention mounted on the front end of a motor vehicle chassis; Fig. 2 is a side elevation of the same, one wheel of the vehicle being removed to show parts otherwise concealed; Fig. 3 is a central, vertical section of the invention; and Fig. 4 is an enlarged detail sectional view showing the joint at the base of the piston.

Referring to the drawings, I have used the numeral 5 to indicate the normally vertical cylinders of my device, which are provided with enlarged bases 6 having flat bearing surfaces 7 adapted to be bolted to the frame 8 of a vehicle. One of the cylinders 5 is secured near each corner of the frame 8, which is supported upon an axle 9 by a piston 10 in each of the cylinders 5 and large studs 11 extending upward from the axle. Each of the studs 11 projects into a recess 12 in the bottom of the piston 10, and the upper part of said piston has a substantially tubular form, being closed at its ends to form an inner compartment 13. Air is admitted to the compartment 13 through a small conduit 14 extending axially through a piston head 15. The conduit 14 is rigidly secured at its upper end in the cylinder head 16 and provided at its lower end with an annular flange or disc 17 adapted to fit snugly in a recess 18 in the head 15.

Formed in the head 15 above the recess 18 is an annular receptacle 19 for lubricant. This receptacle is separated from the main cylinder chamber 20 by a circular flange 21 having a hole 22 arranged to admit lubricant to the receptacle. The upper end of the conduit 14 communicates through a passage-way 23 with the chamber 20. To admit air under pressure to the chamber 20, an air valve 24 is placed on the cylinder head and adapted to be connected with a suitable source of air under pressure, a screw cap 25 being removably secured to the open upper end of said valve.

Escape of air and lubricant from the chamber 20 is prevented by a leather cup washer 19ª surrounding the head 15 and by suitable packing rings in the base 6 of the cylinder. The base 6 is formed with an annular recess around the piston 10 for a series of packing rings 26, which are held in place by a plate 27 and bolts 28. Connecting the cylinder 10 with the axle 9 is the large stud 11 rigidly secured in upright position on the axle and provided with a ball 29 having a seat 30 in the recess 12. To maintain the ball 29 in its seat, a nut 31 is threaded in the recess 12 and provided with an inverted cup-shaped disc 32 which encircles the base of the ball 29. A knurled or otherwise roughened zone 33 on the ball 29 is adapted to be engaged by a similarly roughened edge on a central aperture 32ª in the disc 32. The central aperture 32ª in the disc 32 is somewhat larger than the adjacent circumference of the zone 33, so that normally the disc 32 does not make contact with the ball 29.

Operation

In use sufficient pressure is maintained in the chamber 20 and compartment 13 to carry the weight of the vehicle, and a suitable heavy oil is placed in the receptacle 19 so as to lubricate the surfaces of contact between the cylinder 5 and piston 10. Escape of air is prevented by the oil and by the washer 19ª near the receptacle 19 and also by the several packing rings 26 in the base 6 of the cylinder. To replace lubricant, it is only necessary to remove the valve 24 from the cylinder head and to force oil or grease through the valve opening into the hole 22. Pressure exerted by air in the cylinder 5 upon the head 15 and closed lower end of the piston 10 normally maintains said piston in pre-determined position in the cylinder, and the weight of the vehicle body is transmitted through said piston and the stud 15 to the axle 9.

Vibrations produced by irregularities in the road over which the vehicle is passing will be for the most part absorbed by the cushioning effect of the air in the cylinders. As will be readily understood, the restricted passage-way through the conduit 14 allows air to pass slowly from the chamber 20 to the compartment 13 and back when there is a difference of pressure produced by a sudden thrust of the piston. However, the amplitude of the piston vibrations are small as compared with vibrations of other air springs known to applicant, because the chamber 20 is comparatively small and on account of the retarding effect of the restricted passage-way to the compartment 13. The compartment 13, thus allows sufficient volume of air to give the desired resiliency to the support but sudden increases in pressure caused by rough roads because of the comparatively small volume of air in the chamber 20, do not produce large vibrations. Similarly upon the rebound, sudden decreases in the pressure in the chamber 20 are gradually compensated for by passage of air through the conduit 14 from the compartment 13. An extremely hard thrust on the piston, which would otherwise cause the flange 21 to strike the cylinder head, is prevented from causing such contact, by reason of the location of the opening 23 an appreciable distance beneath the cylinder head, so that the conduit 14 is closed by the piston head near the extreme upward position of the piston. Contact between the disc 17 and base of the head 15 is prevented upon the rebound by the annular recess 18 in which trapped air forms a cushion at the lower end of the piston stroke. By the arrangement of the passage-way 23 near the top of the cylinder and by providing the separate receptacle 19, the lubricant is prevented from escaping into the compartment 13.

To permit forward and backward and lateral tilting of the frame 8 on the axle, the balls 29 are allowed to turn in the seats 30, and it is also necessary to allow for limited lateral movement of the balls 29, relative to the base of the pistons 10. I, therefore, provide sufficient space between the ball 29 and disc 32 to permit partial withdrawal from the seat 30, but prevent withdrawal of the ball through the disc 32 by making the aperture 32ᵃ slightly smaller than the greatest diameter of the ball and by knurling the abutting surfaces of said ball and disc. All possibility of drawing the ball from its seat upon the rebound of the springs is thus eliminated.

Having described my invention what I claim as new and desire to protect by Letters Patent is:

1. A pneumatic spring comprising a normally vertical cylinder having a compression chamber in its upper end, a tubular piston extending into said cylinder from the bottom thereof and closed at its outer end, a head constituting a closure for the inner end of said piston whereby a compartment for air is formed therein, a restricted continuously open passage-way for air extending from said chamber to said compartment adapted to permit the passage of air to and from said chamber, an annular receptacle for lubricant formed in said piston adjacent to the walls of the cylinder, means separating said receptacle from said cylinder, said receptacle and conduit being arranged to prevent the passage of oil downward through said conduit from said receptacle, and means for admitting air under pressure to said cylinder.

2. A pneumatic spring comprising, a cylinder, a tubular piston closed at its outer end, and extending into said cylinder, a head constituting a closure for the inner end of said piston whereby a compartment for air is formed therein, an annular receptacle for oil in said head adjacent to the walls of said cylinder, means separating said receptacle from said cylinder, a conduit for air fixed in the head of said cylinder and extending through an axial opening in said piston head and communicating at its upper and lower ends respectively with said cylinder and compartment, said separating means being adapted to prevent the passage of lubricant from said annular receptacle into said compartment, and means for admitting air under pressure to said cylinder.

3. A pneumatic spring comprising, a normally vertical cylinder, a tubular piston closed at its outer end, and extending into the chamber of said cylinder, a head constituting a closure for the inner end of said piston whereby a compartment is formed therein, an annular receptacle for oil in said head adjacent to the walls of said cylinder, an annular flange disposed on said head to separate said receptacle from the chamber, a conduit for air secured in the head of said cylinder and extending through an axial opening in said piston head into said compartment, said conduit being formed with a passage-way opening into the cylinder chamber near the top thereof, and means for admitting air under pressure to said cylinder.

4. A pneumatic spring comprising a cylinder, a tubular piston closed at its outer end and extending into said cylinder, a head constituting a closure for the inner end of said piston whereby a compartment for air is formed therein, an axial member fixed on said cylinder and extending axially through said head into said compartment, a sleeve projecting into said chamber from said head and forming an annular receptacle for lubricant between the walls of the cylinder and axial member whereby the passage of lubricant into said compartment is prevented and a head on the end of said axial member in said compartment, the periphery of said last mentioned head being normally spaced from the walls of said piston.

In testimony whereof, I have hereunto signed my name to this specification.

ELOV ERICSSON.